(12) United States Patent
Arthur

(10) Patent No.: US 7,154,252 B2
(45) Date of Patent: Dec. 26, 2006

(54) CONVERTER FOR ELECTRONIC FLASHLIGHT

(76) Inventor: James David Arthur, 307 Fifteenth St. #5, Huntington Beach, CA (US) 92648-4255

( * ) Notice: Subject to any disclaimer, the term of this patent is extended or adjusted under 35 U.S.C. 154(b) by 268 days.

(21) Appl. No.: 10/724,291

(22) Filed: Nov. 26, 2003

(65) Prior Publication Data

US 2004/0108841 A1   Jun. 10, 2004

Related U.S. Application Data

(60) Provisional application No. 60/429,871, filed on Nov. 27, 2002.

(51) Int. Cl.
*G05F 1/40*   (2006.01)
(52) U.S. Cl. .................................................... 323/282
(58) Field of Classification Search ................ 323/282, 323/284, 351
See application file for complete search history.

(56) References Cited

U.S. PATENT DOCUMENTS

| | | | |
|---|---|---|---|
| 6,366,028 B1 | 4/2002 | Wener et al. | |
| 6,822,427 B1 * | 11/2004 | Wittenbreder | ............... 323/282 |
| 6,930,473 B1 * | 8/2005 | Elbanhawy | ................. 323/282 |

* cited by examiner

*Primary Examiner*—Adolf Berhane

(57) ABSTRACT

A voltage-boosting dc-to-dc converter that maintains a substantially constant output power into certain loads despite changes in input supply voltage, and whose output power is easily changed.

22 Claims, 3 Drawing Sheets

CONVERTER FOR ELECTRONIC FLASHLIGHT

CROSS REFERENCE TO RELATED APPLICATIONS

This application claims the benefit of provisional patent application Ser. No. 60/429,871, filed 2002 Nov. 27 by the present inventor.

FEDERALLY SPONSORED RESEARCH

Not Applicable

SEQUENCE LISTING OR PROGRAM

Not Applicable

BACKGROUND—FIELD OF INVENTION

The present invention relates generally to battery-powered lights, and more particularly to d.c.-to-d.c. converters designed to supply power to light-emitting diode(s) (LED).

BACKGROUND—DESCRIPTION OF PRIOR ART

LEDs make robust, long-lasting, efficient light sources. Unlike ordinary incandescent bulbs, LEDs cannot be simply connected to a low-impedance battery, but need some form of driver circuit or current limiting. Additionally, the most common and economical single cells—1.5 v alkaline cells—do not produce adequate voltage to power, for example, a white GaN LED with a forward drop of 2.8 volts. Thus, the subject of making LED flashlights and the construction of dc-to-dc converters for this purpose has fascinated the public for some time.

D.C.-to-D.C. Converter Fundamentals

D.C.-to-D.C. converters are used to transform an available voltage source, such as a battery, to a desired voltage, such as the forward voltage Vf of a light emitting diode (LED). "Switching" converters commonly do this by storing energy into an inductor during an "on" time tON, and allowing that inductor to discharge—"flyback"—into the load during an "off" time tOFF. "OFF" and "ON" refer to the state of the power switching element, commonly a transistor, that applies the charging potential to the inductor.

Continuous and Discontinuous Modes

A continuous mode dc-to-dc converter is so-called if current flows at all times—i.e., continuously—in the inductor. This objective is achieved by terminating the flyback interval before the inductor has been fully discharged. When a converter's inductor is allowed to fully discharge during the off interval, this is known as discontinuous mode. In all cases, energy from the input supply is stored into the inductor during the "on" time, and removed (discharged into the load) during the flyback interval, or "off" time.

Figure 5:
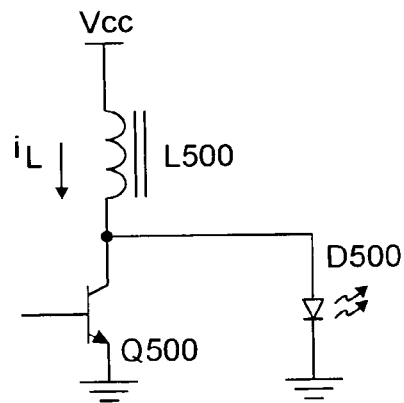

To illustrate the distinction, FIG. 5 depicts a simplified boost converter. During each "on" time period tON switching transistor Q500 is driven ON, grounding one side of inductor L500. The other side of inductor L500 is connected to supply voltage Vcc. To a first approximation, the current iL flowing in inductor L500 increases during time period tON according to $$\Delta iL = tON \cdot Vcc/L. \quad \text{(Eq. 1)}$$

When tON ends the inductor L500 begins to discharge into the load, LED D500. At the end of time period tOFF the current iL in inductor L500 will have decayed to:

$$iL = iL_0 - tOFF \cdot Vdischg/L \quad \text{(Eq. 2)},$$

where Vdischg is the voltage across the inductor as it is discharged. In this case Vdischg is set by and is equal to the forward voltage of the load, LED D500.

Figure 6A:
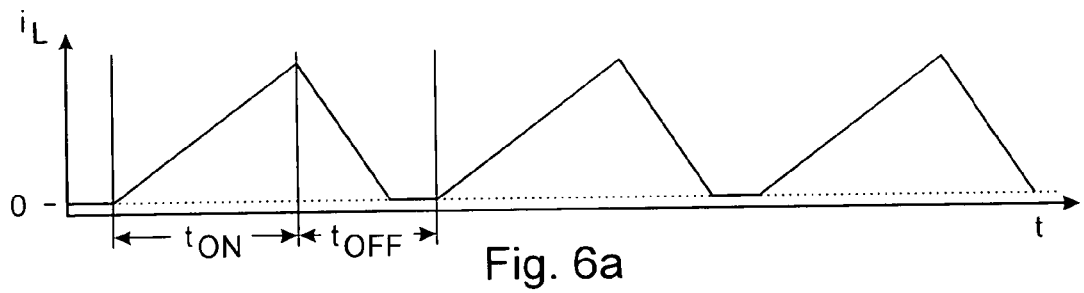

If tOFF is long enough for the inductor L500 to fully discharge (iL=0), then the converter is said to be operating in "discontinuous mode," referring to the non-continuous current flowing in inductor L500. FIG. 6a is an illustration of the current waveform in inductor L500 when operating in discontinuous mode.

Figure 6B:
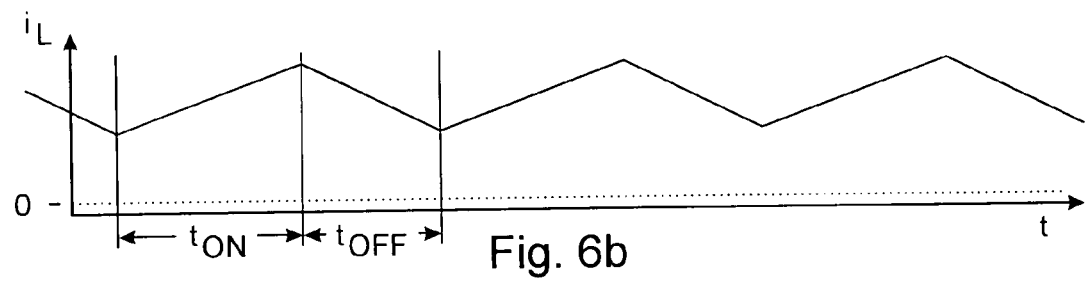

If tOFF ends (and tON commences) before inductor L500 has fully discharged, then some current iL≠0 remains that will be added to during the next "on" cycle. As current is always flowing in inductor L500, the converter is termed a "continuous mode" converter. FIG. 6b depicts the current waveform in inductor L500 when operating in continuous mode.

Runaway and the Need for Limiting

Note that if more current is added to inductor L500 with each "on" cycle tON than is discharged during tOFF, then inductor current iL will increase with each cycle until the limit of the switching transistor Q500, inductor L500, or some other circuit element is reached. This circumstance is ordinarily avoided in prior art circuits by use of feedback, inductor-current sensing schemes, or both, to regulate tON so as to maintain a desired range of currents in inductor L500.

DISCUSSION OF THE PRIOR ART

Horton

Horton[1] discloses how to make an LED flashlight from an existing flashlight. Horton's device comprises a constant voltage output boost/buck converter using a commercial integrated circuit, to be installed inside the flashlight. Current limiting to the LEDs is ensured by a 4.7 ohm resistor.

Stirling

Stirling[2–5] discloses construction of a prototype LED flashlight using a single AAA cell. An existing flashlight was retrofitted[2,3]: the bulb was replaced with an LED, and a voltage-boosting converter was installed inside the flashlight casing to power the LED. Stirling's boost converter used a two-transistor multivibrator to drive a third transistor, the third transistor being a switch used to drive an inductor.[4][5]

Dutcher

Dutcher[6] discloses a dc-coupled multivibrator whose off-time is equal to the discharge time of the inductor, and whose "on"-time is set by the point where the main power-switching transistor pops out of saturation. The Dutcher circuit's power supply voltage-compensation relies on a strategy of increasingly starving the switching transistor—causing it to pop out of saturation earlier than it otherwise would have, abbreviating the on-interval and reducing the converter's power output. Starved base drive, however, does not saturate the switching transistor optimally, resulting in a significant loss of power-conversion efficiency. The drive circuit disclosed also ensures that the switching transistor will still be fully on for the first portion of flyback, producing significant switching losses.

The Dutcher circuit's "on" timing is controlled by a current limit on the power-switching transistor's conduction current. Dutcher does not set on-time with timing components, nor stabilize the output power with a variable timing current into a capacitor. This "on"-time control strategy makes the circuit's output directly dependent on both the power-switching transistor Q2's [6] gain, and its saturation characteristics. These dependencies make the circuit difficult to manufacture in quantity while achieving the intended output power and stability. Transistor gains routinely vary over a 2:1 range from unit-to-unit, for example, directly affecting the circuit's on-time—and thus its power output— and the illumination level of the flashlight. The manufacturer's specification for the 2n3904 used in Dutcher's circuit, for example, states that its gain can range from 100-to-300 at 10 mA to less than ⅛th those values at 200 mA. Transistor gains also suffer from shifts with changes in temperature. These factors combine to make the ultimate power output of the Dutcher circuit difficult to predict.

Dutcher's circuit can also be designed such that the on-interval is terminated by allowing the inductor to saturate and pop the switching transistor out of saturation. Both this and the starved-transistor method result in high switching losses and high susceptibility to secondary characteristics of the components, e.g. inductor saturation current, $V_{sat}$ and $h_{fe}$ of the switching transistor, and change of same with temperature.

Wener

Figure 1A:
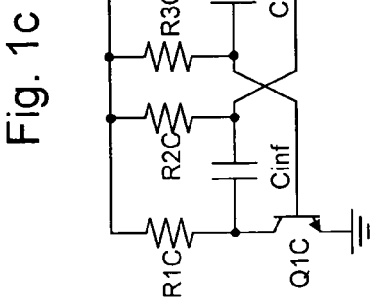
Figure 2A:
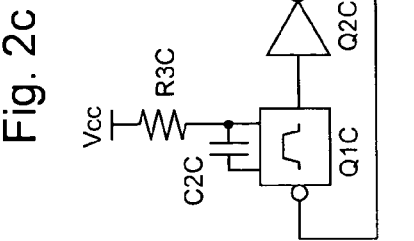

An astable multivibrator, such as in FIG. 1a, comprises two monostable pulse generators, each driving the other. The monostables' timings are set by separate resistor-capacitor (R-C) time constants. If R1A<<R2A and R4A<<R3A then R2A*C1A controls the "off" time tOFF, and R3A*C2A controls the "on" time tON of output transistor Q2A. FIG. 2a is a diagram showing the circuit's functional blocks.

Figure 1B:
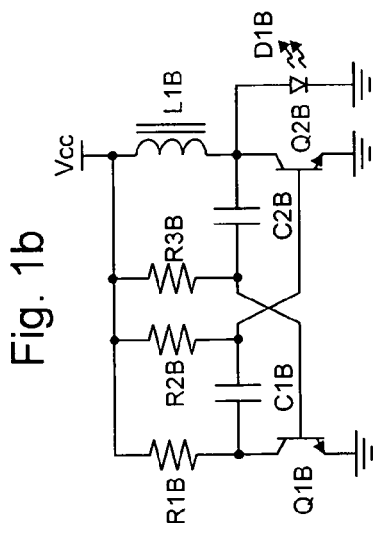
Figure 2B:
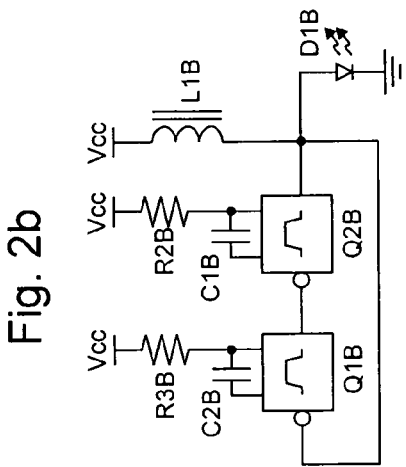

With a minimum of change, an ordinary astable multivibrator (FIG. 1a) can be pressed into service as a dc-to-dc converter. Wener et al.[7] disclose a single-cell LED flashlight employing an internal voltage boosting converter wherein one of the collector load resistors R4A of FIG. 1a is replaced with inductor L1B to produce FIG. 1b, a boost-converter. As with FIG. 1a, R2B*C2B sets tOFF and R3B*C2B controls tON. The result is a boost converter comprising two R—C controlled monostable pulse generators, each triggering the other, where one of these also drives an inductor as a load. tON and tOFF are set by the RC networks, not the inductor. FIG. 2b summarizes the circuit's function in block-diagram form.

The Wener converter is not regulated. Instead, the circuit shifts from discontinuous to continuous mode as supply voltage Vcc rises, adding current into inductor L1B with each cycle. The current in inductor L1B then quickly increases to high levels, the circuit becomes inefficient, and the final result is a power output that varies strongly with battery voltage.

These difficulties can be understood as follows: in FIG. 1B the timing currents controlling tON and tOFF flow into timing capacitors C2B and C1B, respectively, and are set by resistors R3B and R2B, respectively. As supply Vcc increases, both timing currents increase, decreasing both tON and tOFF. During tOFF, tON timing capacitor C2B is charged to the flyback voltage less Vbe(Q1B), typically 3.4 volts when D1B is a white LED. By contrast the tOFF timing capacitor C1B is charged only to Vcc−Vbe(Q2B), typically 1.3V−0.6V=0.7 volts with a moderately used single alkaline cell providing supply voltage Vcc. Because the off-timing resistor R2B has a much lower voltage across it than resistor R3B, small absolute changes in supply voltage Vcc produce greater percentage changes in the timing current resistor that R2B generates. tOFF thus decreases more rapidly than tON. Meanwhile, the time needed to fully discharge inductor L1B increases with supply voltage Vcc according to:

$$tOFF = i(L1B) \cdot L1B / [Vf(D1B) - Vcc]. \quad \text{(Eq. 2a)}$$

tOFF, therefore, decreases as Vcc rises, the opposite of what's desired. The result is that, at some intermediate value of voltage Vcc, tOFF becomes too short to allow full discharge of inductor L1B. The converter enters continuous mode, whereafter inductor L1B current rises very rapidly with Vcc. The power delivered to the load increases even more rapidly, because additional energy is pumped into the boost inductor even as the need for that boost energy is decreasing. Since inductor L1B doesn't have time to fully discharge, its standing current rises with each successive switching cycle. The buildup of standing current in inductor L1B is such that, in a very short time, switching transistor Q2B can no longer switch the excessive current. Thereafter, tON is curtailed when transistor Q2B pops prematurely out of saturation. Inductor L1B then flies back while transistor Q2B is still fully conducting, producing excessive dissipation/waste in transistor Q2B. At high current and flyback voltage levels, such as when driving multiple LEDs, transistor Q2B may be destroyed. A further disadvantage is that the illumination level from the LED D1B falls off precipitously with falling supply voltage Vcc, before the battery has been fully utilized.

A third related problem stemming from this transition to continuous mode is sensitivity to component values: as the output power is highly dependent on the tON and tOFF selected, input voltage, and duty cycle, small changes in component characteristics will affect the point where the converter enters runaway/continuous mode, producing large unit-to-unit variations in said output power.

Figure 4:
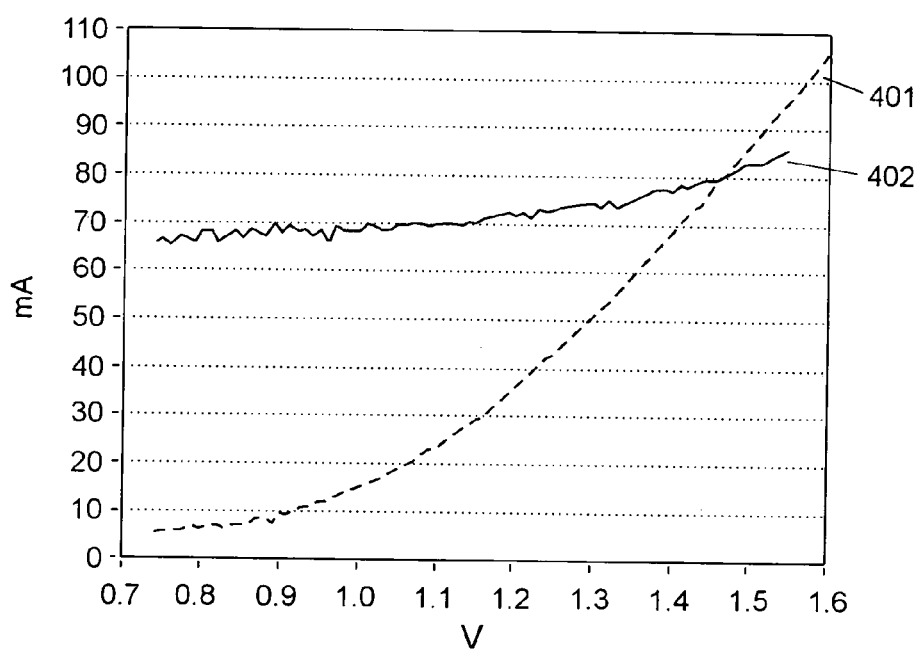

FIG. 4 plots actual measurements of the input-current vs: battery-voltage responses of Wener and the instant invention. Curve 401. depicts the Wener circuit's (FIG. 1B) performance, showing the rapid increase in input current with increasing supply voltages, resulting in an output power that increases exponentially with battery voltage. From 0.75 v to 1.55 v the Wener circuit's input power varies over a ratio of 33:1. Additionally, at higher supply voltages Vcc the circuit is grossly inefficient.

Prior Art Output Stabilization

In prior art converters, inductor current and output power are usually controlled by the use of feedback circuitry to sense and control the switch current, output voltage or current, or a combination of these. The feedback system then adjusts the switch's duty cycle to maintain the desired output.

Prior art continuous mode circuits must have some sort of feedback to prevent the inductor's standing current from increasing each cycle until the inductor—or the switching transistor driving it—saturates out of control. One of several common feedback techniques is to sense the inductor's charging current on a cycle-by-cycle basis and terminate the "on"-time when this peak current reaches a certain target value. As the battery voltage changes, so must the duty factor of the boost circuit. Such circuits add to the cost and complexity of a converter.

[1] Apr. 19, 1995 "Re: LED Flashlight", Kevin Horton, sci.electronics*
[2] Mar. 17, 1997 "Re: Mini-Maglite Alternatives", Ian Stirling, misc.survivalism*
[3] Mar. 21, 1997 "LED brightness", Ian Stirling, sci.electronics.design*
[4] Mar. 22, 1997 "Re: Mini-Maglite Alternatives", Ian Stirling, misc.survivalism*, message 199703220548.FAA20600.mauve.demon.uk
[5] Mar. 22, 1997 "Re: Mini-Maglite Alternatives", Ian Stirling, misc.survivalism*, message 199703220551.FAA22127.mauve.demon.uk
[6] Jun. 18, 2001"Single-cell flashlight uses any type of LED", Al Dutcher, Electronic Design, Jun. 18, 2001, p162–3
[7] U.S. Pat. No. 6,366,028 B1, Wener, et al.
*Internet USENET discussion forum

BRIEF DESCRIPTION OF DRAWING FIGURES

In the drawings, closely related figures have the same number but different alphabetic suffixes.

FIG. 1a. Multivibrator circuit diagram
FIG. 1b. Prior art multivibrator boost-converter circuit diagram
FIG. 1c. The invention—circuit diagram
FIG. 2a. Multivibrator, block diagram
FIG. 2b. Prior art converter, block diagram
FIG. 2c. Block diagram of the instant invention
FIGS. 3a–e Examples of alternate timing current sources, circuit diagrams
FIG. 4. Graph showing line regulation of Wener & present invention
FIG. 5. Simplified schematic diagram of a boost converter
FIGS. 6a–c. Inductor current waveforms for a discontinuous-mode converter, a continuous mode converter, and the instant invention, respectively.

OBJECTS AND ADVANTAGES

The present invention achieves numerous objects and advantages, including:
(a) to make an efficient converter capable of stepping up the output voltage of one or more cells so as to be able to power an LED having a forward voltage greater than said cells;
(b) to make a converter that transforms the voltage of one or more cells to drive an LED or LEDs with substantially constant power despite variations in the converter's input voltage supply;
(c) to make a converter that is capable of producing multiple selectable power outputs, thus permitting user selection between high-illumination and long battery life;
(d) to make a converter that is free from parts' sensitivities, and whose output is predictably set by non-critical components;
(e) to make a converter whose output power versus input voltage characteristic is easily customized.

DESCRIPTION OF THE INVENTION

Figure 1C:
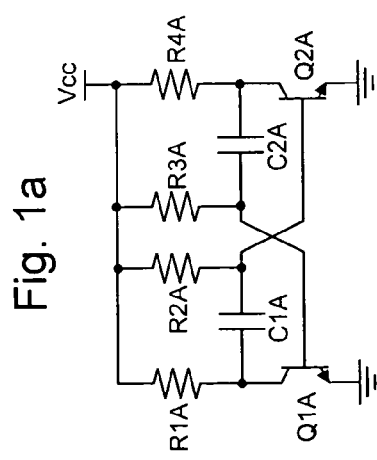
Figure 2C:
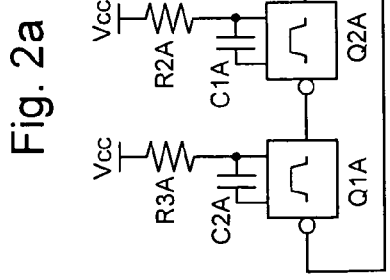

The invention, depicted in FIG. 1c., consists of an astable multivibrator-style oscillator comprising two transistors, cross-coupled with capacitors, where the collector load of one transistor has been replaced with an inductor, and the traditional timing capacitor to the base of this same transistor has been replaced with a relatively large-valued d.c. blocking capacitor instead.

For economy and simplicity, the preferred version of the invention uses a resistor to provide a timing current that varies with supply Vcc, yielding an output power characteristic that increases approximately linearly with Vcc, however more complicated timing current networks such as a resistor in series with a diode, or current sources, may be used to further reduce the variation of output power over changes in Vcc (e.g. FIGS. 3a–e).

Operation of the Invention

Start-up

Referring to FIG. 1c, during initial startup the time constants ensure that resistor-capacitor timing network R3C—C2C charges first, driving transistor Q1C into a linear region of operation. Q2C's base charges up to Vbe(Q2C) via R2C until Q2C conducts. At this point each transistor amplifies its own noise, producing an output. Said outputs are each coupled to the other transistor, amplified, then coupled back to the first transistor. The effect is regenerative and oscillation rapidly ensues.

D.c. blocking capacitor Cinf serves to allow startup with Vce(Q1C)<Vbe(Q2C), a condition where startup could otherwise fail with Q1C "on" and Q2C "off". If operation over a more limited supply voltage range is acceptable it is possible to eliminate R2C and Cinf by connecting the base of Q2C directly to the collector of Q1C. As a guideline, design calculations should be made to ensure that the timing current supplied by R3C (or other timing current generator) during startup is less than approximately [Vcc−Vbe(Q2C)]/[R1C*hfe(Q1C)].

Normal Operation

Once oscillating, consider: when transistor Q2C switches off, L1C will flyback, driving transistor Q1C into saturation while the magnetic field stored in L1C decays. When its flyback current decreases to zero, the voltage across L1C decays rapidly. The C2C-L1C node voltage falls, and with it the voltage at transistor Q1C's base, biasing transistor Q1C into cutoff. Transistor Q1C's collector voltage rises, biasing switch transistor Q2C "on" via blocking capacitor Cinf. Transistor Q2C stays on either until the timing current from R3C charges C2C to Vbe(Q1C), or until Q2C's collector current through L1C exceeds the level supportable by transistor Q2C's base current. When one of these terminating conditions is reached, transistor Q2C's collector voltage abruptly rises, transistor Q1C is biased on, transistor Q2C is cut off, and the cycle repeats.

Optional rectifier DIC and filter capacitor C3C serve to filter the converter's output, providing direct-current drive for the LED D2C. If desired these can be omitted & the LED allowed to run on pulsating current present at the collector of Q2C.

It can be seen that the present invention dispenses with the need for external feedback, setting a stabilized output power predictably by setting a single timing parameter—tON—with non-critical components. Specifically, replacing off-timing capacitor CiB of FIG. 1B with d.c.-blocking capacitor Cinf, transforms the astable multivibrator of FIG. 1b into the flyback-controlled converter of FIG. 1c. The new circuit's "on" time tON is set by R3C*C2C. Adjusting this one time-constant now provides a simple, single-point means of setting this converter's output power.

Output Stabilization Action

The new circuit's "off" time is "flyback" controlled: controlled by the discharge/flyback time of inductor L1C. Inductor L1C's discharge time, in turn, is proportional to its initial current, and inversely proportional to the voltage across it, i.e.

$$tOFF = iL \cdot L1C/[Vf(D2C) + Vf(D1C) - Vcc]. \quad \text{(Eq. 3)}$$

This happy fact serves to stabilize the converter's output: when the input voltage (Vcc) is high and the flyback voltage across the inductor is reduced, tOFF is extended. The longer off-time, in turn, reduces the overall duty cycle $$\text{duty cycle} = (tON/(tON + tOFF)) \quad \text{(Eq. 4)},$$

reducing the converter's power output.

As the input voltage is lowered, a larger flyback voltage appears across the inductor L1C during tOFF, discharging it more rapidly. Reducing tOFF serves to increase the overall duty cycle (Eq. 1), boosting power output, tending to offset the effect of the lower supply voltage (see FIG. 4).

More particularly, tOFF is approximated by $$tON * Vcc/(Vout + Vf(D2C) - Vcc) \quad \text{(Eq. 5)}.$$

Note that the numerator in this expression increases with Vcc, whereas the denominator term decreases. Both serve to increase tOFF with increasing Vcc, stabilizing the output power.

Figure 6C:
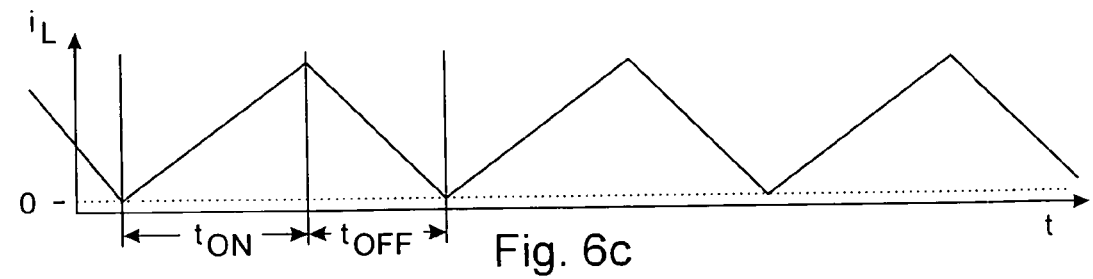

A second Vcc-related compensation is simultaneously present, operating as follows: as Vcc falls the voltage across tON timing resistor R3C is reduced, causing it to charge tON timing capacitor C2C more slowly. tON is extended, allowing inductor L1C to charge to higher currents, and the converter's output power increases, opposing the drop in its supply voltage. FIG. 4. graph 402 shows actual input-current vs. input-voltage performance of a prototype of the invention; FIG. 6c illustrates the current waveform in inductor L1C.

It can be seen that replacing the off-timing capacitor C1B (FIG. 1B) with d.c.-blocking capacitor Cinf (FIG. 1C) creates a new, compensated topology whose output power increases approximately linearly with input voltage, in contrast with traditional circuits whose output powers increase exponentially or in uncontrolled fashion under the same conditions.

Further Compensation

If desired, a voltage divider network from Vcc to ground, with the divider tap connected to C2C, with or without non-linear elements such as diodes, may also be employed instead of a simple timing resistor R3C. Using a divider serves to decrease the effective voltage applied to the resulting effective timing resistor, extending on-time as Vcc decreases (because more time is needed to reach the voltage at which Q1's conduction terminates the on-cycle).

Replacing the on timing-resistor R3C with a more complex network, such as a resistive divider, current source, or resistor-diode networks (FIGS. 3a–e, respectively) are all effective ways to produce a power output characteristic that is substantially constant despite changes in Vcc.

A voltage divider network, with or without non-linear elements such as diodes, may also be employed instead of a simple timing resistor.

Buck-boost

In the case where Vcc is greater than the forward voltage of the LED D2C, the grounded terminals of C3C and D2C can be instead connected to Vcc. This allows the converter to be used in multi-cell and lithium-cell applications.

Alternate Timing Current Generators

It is possible to tailor the invention's output-power vs input-voltage response, which might be desired, for example, to give warning of a depleted battery, or to provide the most constant possible light intensity if that is desired. FIGS. 3a–e depict alternative timing current networks to replace timing resistor R3C of FIG. 1C.

Figures 3A, 3B, 3C, 3D, 3E:
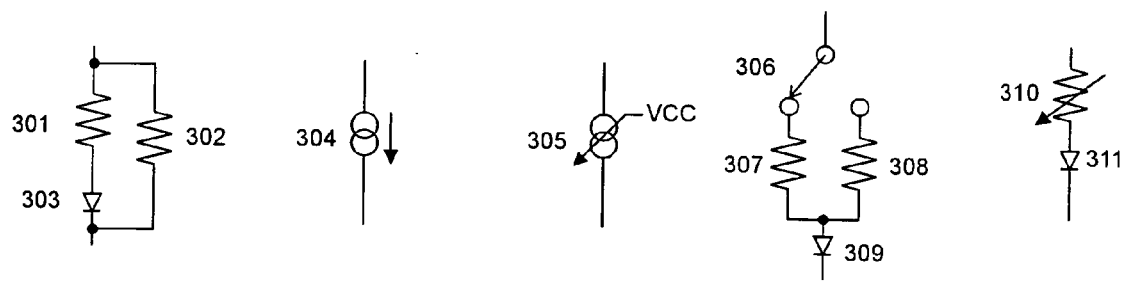

FIG. 3a. shows a diode in series with a resistor, with the combination shunted by a second resistor. The diode serves to provide a voltage below which the timing current is very small, and to increase the timing current more rapidly about this voltage than would be supplied by a simple resistor. The shunt resistor is optional, and provides a minimum current proportional to Vcc. It is thusly possible to create a timing current that reduces the converter's overall input current with increasing Vcc, resulting in constant (or even decreasing) power output, i.e., constant LED brightness.

FIG. 3b. and 3c. depict current sources: the constant current source of 3b. produces constant tON and a power output that varies linearly with Vcc. The Vcc-dependent current source of FIG. 3c. produces a tON that varies inversely with Vcc, yielding constant power output.

FIG. 3d. depicts two switchable timing resistors in series with a diode, which produces a converter with two switch-selectable output powers that are stabilized over variations in Vcc.

FIG. 3e. depicts a variable resistor in series with a diode, providing a compensated, variable power source for dimmable lighting applications.

Obviously these are not the only possible timing current generators, but are merely examples intended to show the flexibility and ease of adjustment of the present invention.

Review

From the description above, a number of advantages of the invention become evident:

(a) The present invention achieves output power control without added feedback circuitry or current-sensing schemes required in prior-art circuits. This is possible because the flyback-control mechanism of the instant invention provides inherent feedback. Further output stabilization is afforded by a simple timing current generator that abbreviates "on" time with increases in supply voltage.

(b) A further advantage is that the present invention's output power versus input voltage characteristic is easily compensated by employing alternate timing current generators, e.g. FIGS. 3a–e, to supply a customizable result.

(c) The present invention switches "on" at the zero-current point, improving efficiency.

(d) Flyback control of off-time guarantees that the invention will not enter a runaway continuous-mode region of operation, as is inherent with the prior art. The instant invention's topology ensures that off-time will increase with increasing supply voltages. By contrast, the prior-art multivibrator converter's off-times decrease with increasing supply voltage, permitting less of the inductor's energy to be discharged and increasing the possibility for runaway, undesirable saturation of the inductor, and/or overcurrent in the load or switching transistor.

(e) The output power of the present invention is substantially stable over variations in input voltage. FIG. 4 curve 402. shows the performance of the instant invention of FIG. 1c, whose input current is substantially stable, operation is highly efficient, and input power varies over a ratio of 2.6:1 over the input voltage range, a 13-fold improvement when compared to the prior art curve 401.

(f) If desired, even greater output stability can be produced using alternate timing current generators (FIGS. 3a–e) to produce the desired output power versus input voltage characteristics.

(g) A further advantage of the instant invention is that its output can be readily controlled by changing the timing current flowing into a single node (i.e., FIG. 1c, junction of Q1C(base) and C2C). This makes the circuit suitable for applications where more than one power output level is needed, such as in a flashlight with multiple brightness levels. Ordinary multivibrator circuits have two independent time constants and so cannot be as easily adjusted.

CONCLUSIONS, RAMIFICATIONS, AND SCOPE OF INVENTION

In summary, changing the function of C1B (FIG. 1B), in a prior-art configuration, produces a new circuit and functionally different topology, with profoundly different and highly desirable characteristics.

The new topology employs a new mode of operation, and possesses a number of important advantages. Among these advantages are dramatically improved stability of output over variations in input voltage, insensitivity to component tolerances, freedom from runaway, and the ability to control the circuit's output power via a single-point adjustment. Although this invention has been set forth as an ideal driver for light-emitting diodes, the invention is useful as a general-purpose d.c.-to-d.c. converter with numerous diverse applications that will be apparent to those skilled in the art.

The invention claimed is:

1. A stabilized power converter comprising:
  (a) power supply means for supplying energy, and
  (b) inductive means for storing a stored energy, coupled to said power supply means, and
  (c) on-timing means, for establishing an on time interval, and capable of being disabled by a discharge potential across said inductive means during an off time interval, and
  (d) load means coupled to said inductive means for receiving said stored energy during said off time interval, and
  (e) power switching means responsive to said on-timing means, disposed to connect said inductive means in series with said power supply means and storing said stored energy in said inductive means during said on time interval,
  whereby said power switching means stores energy from said power supply means in said inductive means during said on time interval, and said stored energy is discharged from said inductive means during said off time interval into said load means, and the duration of said off time interval is terminated at such time as said stored energy in said inductive means is substantially fully exhausted.

2. Claim 1, where said load means comprises a plurality of light-emitting diodes.

3. Claim 1, where said on-timing means comprises
  (a) a timing-current generator capable of generating a timing current, and
  (b) a timing capacitor coupled to said timing current generator for producing a timing voltage, and
  (c) a threshold-detector means coupled to said timing capacitor for detecting a threshold voltage, and
  (d) reset means for resetting said timing voltage on said timing capacitor to a reset voltage during said off time interval,
  whereby said timing capacitor integrates said timing-current from said timing current generator and accumulates a timing voltage until said threshold voltage is reached, producing an output signal from said threshold detector, said output signal being coupled to and operating said power switching means.

4. Claim 3, where said timing-current generator comprises a resistor in series with said power supply means.

5. Claim 3, where said timing current generator comprises a resistor and a diode in series electrically connected to said power supply means.

6. Claim 3, where said timing current generator comprises a current source means capable of supplying a current responsive to said power supply means.

7. Claim 3, where said threshold-detector means is a transistor.

8. Claim 3, where said load means comprises a plurality of light-emitting diodes.

9. Claim 3, said load means comprises a diode rectifier in series with a plurality of light-emitting diodes paralleled with a filter capacitor.

10. A power converter for a light-emitting diode flashlight comprising:
  (a) power supply means, and
  (b) load means for providing an electrical load, and
  (c) inductive means for storing a stored energy, coupled to said power supply means, and for producing a momentary discharge voltage reversal when said stored energy in said inductive means is substantially fully exhausted, and
  (d) on-timing means for establishing an on time, and
  (e) power switching means responsive to said on-timing means, coupled to said inductive means such that closing and opening said power switching means causes energy from said power supply means to be alternately stored in said inductive means during said on time, and discharged into said load means when said power switching means is opened, and
  (f) off-timing means responsive to said discharge voltage reversal of said inductive means for establishing an off time,
  whereby said off time is determined by the discharge time of said stored energy from said inductive means,
  whereby a stabilized electrical current is provided to said load means.

11. Claim 10, where said on-timing means comprises a resistor-capacitor network.

12. Claim 10, where said on-timing means abbreviates said on time in response to increased supply voltages.

13. Claim 10, where said off-time terminates at substantially the same time as said stored energy in said inductive means is substantially exhausted.

14. A stabilized power converter comprising
  (a) a first power input terminal means for supplying a first voltage, and
  (b) a second power input terminal means for supplying a second voltage, and
  (c) a first transistor, possessing a first collector, a first base, and a first emitter, and
  (d) a second transistor possessing a second base, a second emitter, and a second collector, and (e) an inductance, possessing a first terminal connected to said first voltage, and a second terminal connected to said first collector of said first transistor, and
(f) a timing capacitor, coupling said first collector and said second base, and
(g) a timing current generator means for generating a timing current, and
(h) a first coupling means for electrically coupling two circuit nodes, and
(i) an output load means, and
(j) a collector load means for providing a second collector load,
wherein said first collector is additionally coupled to said output load means, and
said first coupling means couples said second collector to said first base, and
said timing current generator means is connected to said timing capacitor, and
said collector load means is coupled to said second collector, and
said first coupling means couples said second collector and said first base, and
said first and second emitters are coupled to said second voltage, and
said output load means is connected in series with said first collector and said second voltage,
whereby said first transistor is repetitively operated for an on time followed by an off time, causing said inductance to alternately store energy from said first power input terminal and discharge said energy into said output load means,
whereby a stabilized electrical current is delivered into said output load means.

15. Claim 14 where said first coupling means is a direct-current-blocking capacitor and said collector load means comprises
(a) a first resistor connected between said first voltage and said second collector and
(b) a second resistor connected between said first voltage and said first base,
wherein the time-constant obtained by multiplying the value of said direct-current-blocking capacitor by the sum of the values of said first and second resistors is greater than the period of a full cycle of said stabilized converter.

16. Claim 14 where said first coupling means is a wire and said collector load means is a resistor connected between said first voltage and said second collector.

17. Claim 14 where said collector load means is a resistor connected to said first voltage.

18. A method for producing a stabilized electrical current in a load at a second voltage from an input electrical power at a first voltage, comprising:
(a) providing a power supply capable of supplying energy at a first voltage, and
(b) providing a timing means for producing a first signal, and
(c) providing an inductive element means coupled to said power supply for storing energy from said power supply, and
(d) providing an electronic switching means responsive to said first signal and capable of causing electrical energy to be stored in said inductive element means, and
(e) providing an electrical load means for receiving said stabilized electrical current, and
(f) charging said inductive element means via said electronic switching means for an on time responsive to said first signal, and
(g) allowing said inductive element means to discharge into said load until the voltage across said inductive element means reverses, and
(h) repeating steps (f)–(g) at a rate sufficient to create said stabilized current,
whereby said stabilized electrical current at said second voltage is produced in said load.

19. Claim 18, where said first signal is inversely responsive in duration to said first voltage of said power supply.

20. Claim 18, where said electrical load means comprises a plurality of light-emitting diodes.

21. Claim 18, where said electrical load means comprises a rectifier diode connected in series with a filtering capacitor which is connected in parallel with a plurality of light-emitting diodes.

22. Claim 18, where said electronic switching means is a transistor.

* * * * *